June 12, 1923.                                                                                              1,458,622

J. M. HIGGINS

SHACKLE

Filed July 27, 1921

Inventor
John M. Higgins
by Mitchell, Chadwick & Kent
Attorneys

Patented June 12, 1923.

1,458,622

UNITED STATES PATENT OFFICE.

JOHN M. HIGGINS, OF BOOTHBAY HARBOR, MAINE.

SHACKLE.

Application filed July 27, 1921. Serial No. 487,957.

*To all whom it may concern:*

Be it known that I, John M. Higgins, a citizen of the United States, residing at Boothbay Harbor, in the county of Lincoln and State of Maine, have invented certain new and useful Improvements in Shackles, of which the following is a specification.

This invention relates to improvements in shackles. More particularly it is developed and herein shown as it may be applied to shackles used by ships and longshoremen in cargo work, but it is applicable for various other uses.

It is an object of the invention to improve upon the anchor shackles of screw pin type which are in almost universal service for connecting a rope or chain to a hook or other appliance. Among the faults of such are the tendency of the pin to come unscrewed through slatting of the rope; the inability of a sling to slide over the shackle, as is sometimes required when a lift of goods is too large for the sling, in which case the hook and shackle are run through one loop of the sling which thereafter slides along as the pull tightens, and catches on the eye of the pin; the impossibility of getting an anchor shackle through the eye splice in wire rope, after the latter has been drawn flat and closed by a heavy lift, until wedged open again with a tool; and the spreading of the shackle caused by unscrewing of the pin and the riding of the hook near one side, through which occasionally the cargo is dropped and the shackle spoiled. Although its use is subject to disadvantages and annoyances accompanied sometimes by serious damage to life or to cargo, the advantages of the screw pin, the necessity that apparatus of this sort be simple, and the fact that nothing better has been known, have doubtless been responsible for its continuance in use.

The present invention aims to provide an improved shackle which is sufficiently simple in construction yet which is free from the objections stated, and which has other advantages. This is accomplished by bowing the pin in the middle, making a slight valley in which the eye of the hook or rope always will ride. The hook or rope is thus kept away from the sides of the shackle, and rotation of the pin with consequent unscrewing when in use is prevented, for the pull of the load exerts tension on the pin to keep the latter from unscrewing. An ordinary pin having such a bend in its shaft could not be unscrewed so as to be withdrawn from the shackle but the invention provides for ready removal of the pin by making in one end of the bail an extra large hole, so that the bent shaft can be drawn out through it. By making the shaft of the pin next to its head correspondingly large, the pin shaft, when screwed tight, will fill this large hole. Another feature is the making of the pin head with an inclined top, thinner toward the bow of the yoke, and thicker toward the jaw ends, and provided, if desired, with a central rib with accentuated slope, both the top and the rib being with a smooth outer surface, so that a rope, hook or other apparatus can readily slip over them. Such slippage is not possible with the ordinary shackle pin because of the part which protrudes in order to form the eye of the pin. The invention does not sacrifice the eye, but arranges it in such manner that it does not constitute an obstruction, by placing it at the high side of the inclined head. The eye is of suitable size to permit the insertion of the pointed end of a bale hook or other tool, for tightening or unscrewing the pin; and the rib can be gripped with a wrench for the same purpose, although ordinarily the pin can be tightened sufficiently by hand. Another feature is the provision of a wedge-shaped edge for one end of the bail in consequence of which the yoke can be slipped through an eye splice in wire rope without having the eye specially wedged open for it. A hook or sling will not catch on the head of the pin when slipping past the shackle; the pin itself will not come unscrewed through variations in friction when the rope is slatting and swinging on the pin; the pin-bow will keep whatever is attached to the pin central in the shackle, which therefore will not spread if the pin happens not to be set up tight; and the pin can be screwed up sufficiently tight for all cargo work with one's fingers or with a bale hook. In addition the wedge end of the shackle slips the bail in, in passing through an eye or can be used for an initial spreading of an eye when necessary in an extreme case.

The drawings illustrate a form of the invention which I at present consider preferable for cargo work; but it can be adapted for other uses or even otherwise arranged for this use, while still employing those features of novelty which characterize the invention. It is intended that the patent shall cover by suitable expression in the appended claims whatever features of patentable novelty exist in the invention disclosed.

Figure 1:
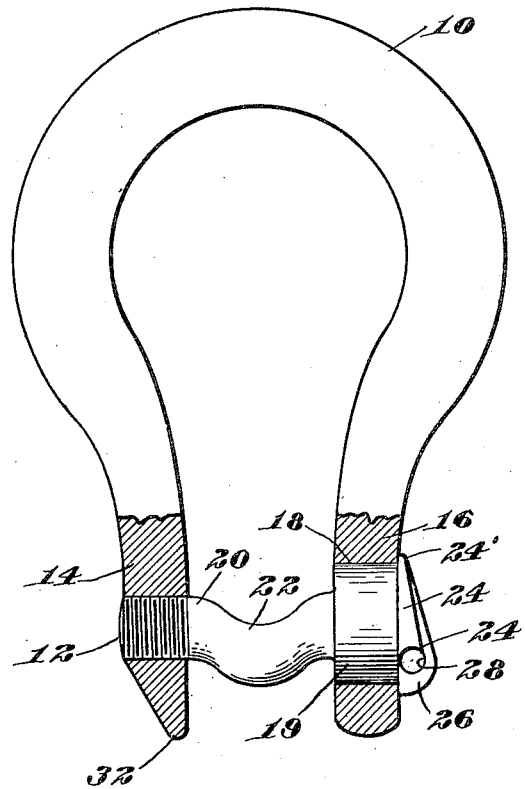
Figure 1 is a side view of a shackle embodying the invention, the jaws of its yoke being in section as on line 1—1 of Figure 2.
Figure 2:
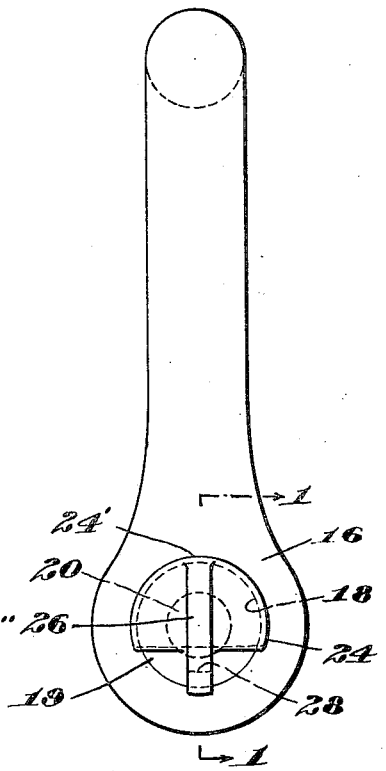
Figure 2 is an edge view of the same, looking from the right in Figure 1.
Figure 3:
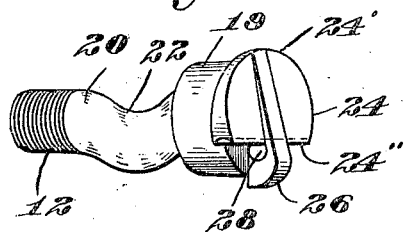
Figure 3 is a perspective of the pin.
Figure 4:
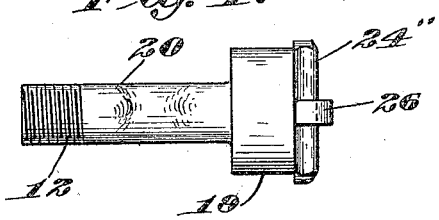
Figure 4 is a plan of the pin as seen from below in Figure 3.

Referring to the drawings, the shackle comprises a bail or yoke 10 and a pin whose shaft is marked 20. The bail is looped, with its jaws or arms 14, 16, in approximate parallelism and connected, by the shaft 20 which extends from one to the other, thereby completing the eye or enclosure of the shackle. Suitable means is provided to hold this pin removably in place. As illustrated this comprises the provision of a hole through jaw 14 tapped to receive the threaded extremity 12 of the shaft 20. The other jaw, 16, has a corresponding hole 18 on the same axis, through which the shaft passes to reach the hole in jaw 14. The shaft is not a true cylinder throughout its length as is customary in shackle pins, but has a curve where its middle portion is offset or bowed outward a distance equaling about a half of its diameter. The bow or valley 22 thus formed is open toward the eye of the shackle, when the pin is set tight. The hole 18 in jaw 16 is smooth, cylindrical and considerably larger than the hole in jaw 16. The extra size permits insertion and removal of the curved shaft through this hole and permits its rotation for unscrewing, in case the relative length of bow, spread of jaws and thickness of jaws require that accommodation, for it is evident that if a bow were made in the shaft of an ordinary shackle the same could not be inserted through the ordinary hole, it being essential that the shaft of the pin fit snugly the hole in each jaw. The present invention meets this need, notwithstanding the large size of the hole 18, by providing an enlarged portion or neck 19 on the pin, of cylindrical shape and of suitable size to fit the hole 18, this neck being located between the shaft 20 and the head 24 of the pin. The head 24 bears on the outside of the jaw 16 and is adapted to be set up tight against it by the screw portion 12. The head is shaped as a sort of transversely extending wedge having its inner surface perpendicular to the axis of the pin for bearing on the outside of the jaw, and having its outer or top surface inclined to make a thin edge on that side of the head which is toward the bail of the shackle when the head is set up tight. This thinner edge 24' is on the same side of the axis with the valley 22 of the curved shaft.

Its thicker edge 24'' is towards the ends of the jaws. A ridge 26 may be provided extending transversely of the head, running over the top thereof from its thinner edge to its thicker edge at a slightly greater incline than the incline of the main part of the top, to a substantial height at the thicker side of the head. The ridge projects a little beyond this thicker edge of the head, and through the projecting portion a hole 28 is drilled, at right angles to the extent of the ridge and large enough to receive the pointed end of an ordinary bale hook, (not shown) or other implement. A portion of the thicker edge of the head of the pin on each side of this hole may be cut away, making a grooved seat against which the bale hook may rest when its tip is in the hole. Such a hook can then be used as an implement to turn the pin, having ample leverage for screwing it tight or unscrewing it. If preferred, the ridge affords a hold for a wrench, for the same purpose. The gradual increase in thickness of the pin head, from its bail side towards its jaw side, results in the production of a head having sufficient strength and yet having no outstanding protuberance which will prevent the shackle from slipping through a loop when the rope to which it is attached is drawn through. The head may, in fact, be curved somewhat to a greater thickness at the center; and the presence of the wedge-ridge 26 across the middle of the head helps still more the passage of any tight loop.

The jaw 14 of the bail is tapered at its end to form the wedge 32, which can be used as leading end, and if necessary to spread a flattened or closed eye of a rope or cable apart, to enable the shackle bail to be slipped through. This tapering of the end of the jaw also does away with the blunt edge of the jaw and permits the shackle as a whole to slip more easily through a sling or other loop when being drawn up taut. Furthermore by thus reducing the thickness of the jaw 14 toward its end, as the virtual thickness of the other jaw 16 becomes greater by the gradual increase of thickness of the pin head, the overall or circumferential dimension of the shackle at its jaw ends is kept approximately constant. In shackles hitherto used it is necessary to slacken the tension of the line when there is occasion for a loop to slip past the shackle, because the head of the ordinary shackle pin catches the loop, but with the improved construction of jaw end and pin head above-described the sling loop can slip past the pin without necessity for thus slackening the line. It will be observed that the one-sided taper of the end of jaw 14 is somewhat parallel to the head end of the pin. This enhances the benefit gained from the shape of the head of the pin; but it will be observed that the latter alone, if there were no reduction of the jaw end, would act as a sort of wedge to enlarge the loop gradually and help it to slip off the shackle, so as to become tight about the load being lifted.

When the shackle is secured through the eye of a hook, or in a loop of rope, it is manifest that the least tension on the hook or rope will draw it into the valley of the bow 22. This centers the pull on the shackle evenly between the jaws, thereby preventing them from spreading or bending as sometimes occurs if the rope can slip along the pin and pull next to the jaw. The settling of the rope under tension into the valley of the pin keeps the bow part of the pin as near as may be to the opening between the jaws; and this prevents rotation of the pin even under frequent slatting or slapping of the rope. It is clear that were the pin to start to unscrew, the incidental rotation would immediately cause a tightening of the rope passing over the pin, for, upon turning, the bow of the pin would act as a crank turning about the axis of the pin, to draw the rope up nearer the loop of the shackle. But the tension on the rope prevents this, and would draw it back if there were any initial increment of motion in that direction. Therefore the pin cannot come unscrewed when in use. The action of the load, or even of the mere weight of rope or hook, is to keep it automatically screwed tight.

Although here shown as screw threaded, it is obvious that the pin might be otherwise secured, and that other variations might be made within the scope of the invention.

I claim:

1. A shackle comprising a bail and a pin passing through and connecting the jaws thereof; said pin being rotatable for jaw engagement and disengagement and having in its middle a rope engaging surface which is set nearer to its axis than are other parts of the pin's middle, whereby the rope stress prevents its rotation; the point portion of the pin being cylindrical, fitting and filling its jaw hole; and the part of its head portion which is set in the jaw being cylindrical fitting and filling its jaw hole; and the said last mentioned hole being cylindrical and of large enough diameter for the said middle portion of the pin to pass through it.

2. A shackle comprising a bail and a screw pin passing through and connecting the jaws thereof; each said jaw having a cylindrical hole symmetrical about the axis of the pin and filled by the pin; said pin having in its middle a depression facing the bail, whereby the stress of the rope in normal use prevents turning of the pin; the cylindrical hole in one of said jaws being large enough for the insertion of the pin through it to its normal position of use.

3. A shackle comprising a bail having jaws and a pin passing through and connecting said jaws, there being means securing the pin removably in place, and the shaft of the pin having an offset between the jaws, one of said jaws being rotatable while passing through the bail for jaw engagement and disengagement and having a large hole through which the offset portion is removable, and the said pin having a large neck adapted to fill said hole.

4. A shackle comprising a bail having jaws and a connecting pin with an offset in its shaft forming a bow thereof between the said jaws; the jaws having holes of two sizes, one to receive the end of the pin and the other, larger, to pass the bow of the shaft, one of said holes being threaded; and said pin having a neck to fill the said larger hole and threads to engage said jaw threads.

5. A shackle comprising a bail having jaws; and a pin connecting the jaws, having a head outside of one of the jaws, said head having one edge relatively thin and having its top surface rising gradually from said edge to a greater distance from the outer surface of said jaw at the opposite edge of the head; means being provided for maintaining said thin edge toward the loop of said bail, whereby the head presents minimum obstruction to passage of a loop of rope from the direction of the loop of the bail.

6. A shackle comprising a bail having jaws, and a pin connecting them; said pin having threads to engage one of them, and a head having one edge relatively thin and its opposite edge relatively thick and provided with a hole whereby the head may be engaged to be turned.

7. A shackle comprising a bail having jaws, and a pin connecting them; said pin having threads to engage one of them, and a head having one edge relatively thin and its opposite edge relatively thick and a ridge centrally across it at a greater incline; there being a hole through the high end of said ridge adapted to receive a tool to turn said pin.

8. A shackle comprising a bail having jaws, and a pin connecting them; said pin having threads to engage one of them, and a head having one edge relatively thin and its opposite edge relatively thick and a ridge centrally across it at a greater incline; there being a hole through the high end of said ridge adapted to receive a tool to turn said pin, and an offset in the shaft of the pin midway between the jaws and so positioned with respect to the head that when the pin is screwed in with the valley of the offset toward the bail, the thinner edge of the head will also be toward the bail to permit easy slippage of the shackle through a loop.

9. A shackle comprising a bail having jaws, and a pin connecting them; said pin having a head whose top surface rises gradually from the outer surface of one of said jaws; and the other of said jaws having its outside surface inclined inward in such direction as approximately to neutralize increase of overall dimension occasioned by said gradual rise thereby facilitating the passage of a loop.

10. A shackle comprising a bail having jaws, and a pin connecting them; said pin having a head with one edge relatively thin and its opposite edge relatively thick whereby its top surface slopes gently from the surface of one of said jaws, and said pin also having means whereby a loop engaged around its shaft maintains said thin edge of its head toward the loop of the bail; the other of said jaws being wedge shaped with its outside surface approaching its inside, thereby lessening the distance between the outside surfaces of said jaws as the rise of the pin head progresses, whereby a loop may slip past said jaws substantially without enlargement.

11. A shackle comprising a bail having jaws, and a pin connecting them whose head projects from one of said jaws; the other of said jaws being reduced in thickness toward its end to neutralize approximately the increase of overall dimension occasioned by said projecting head, thereby facilitating the passage of a loop.

Signed at Boothbay Harbor, Maine, this nineteenth day of July, 1921.

JOHN M. HIGGINS.